United States Patent [19]

Lenoir et al.

[11] Patent Number: 4,747,637
[45] Date of Patent: May 31, 1988

[54] EXTERNALLY RETRACTABLE SUNROOF

[75] Inventors: John R. Lenoir, Fenton; Randy S. Williams, Livonia, both of Mich.

[73] Assignee: Cars & Concepts, Inc., Brighton, Mich.

[21] Appl. No.: 938,817

[22] Filed: Dec. 8, 1986

[51] Int. Cl.[4] .......................... B60J 7/047; B60J 7/19
[52] U.S. Cl. .................................. 296/218; 296/216; 296/220; 296/224
[58] Field of Search ................ 296/216, 218, 220, 224

[56]       References Cited
       U.S. PATENT DOCUMENTS

| | | | |
|---|---|---|---|
| 3,955,848 | 5/1976 | Lutz et al. | 296/218 |
| 3,974,753 | 8/1976 | Blomgren et al. | 296/218 X |
| 4,005,900 | 2/1977 | Rauthmann et al. | 296/218 |
| 4,403,805 | 9/1983 | Strem, Jr. et al. | 296/221 |
| 4,407,541 | 10/1983 | Boots | 296/216 |
| 4,428,155 | 1/1984 | Kwan et al. | 296/218 |
| 4,469,370 | 9/1984 | Petersen | 296/218 |
| 4,531,777 | 7/1985 | Bienert et al. | 296/223 |
| 4,609,222 | 9/1986 | Boots | 296/218 |
| 4,626,025 | 12/1986 | Haecker et al. | 296/218 |

Primary Examiner—Dennis H. Pedder
Attorney, Agent, or Firm—Brooks & Kushman

[57]                ABSTRACT

A vehicle sunroof (10) is disclosed as including a peripheral frame (16) on which a sunroof panel (24) is mounted by a track mechanism (32) which has a pair of side track assemblies (34) each of which includes detachable connections (36,38) for permitting detachable securement of the panel. A power actuator (40) of the sunroof drives the track assemblies (34) to position the attached panel (24) in a closed position, an inclined vented position, and an externally retracted storage position located rearward of the vented position over the roof.

10 Claims, 3 Drawing Sheets

EXTERNALLY RETRACTABLE SUNROOF

TECHNICAL FIELD

This invention relates to an externally retractable sunroof for a vehicle roof.

BACKGROUND ART

Vehicle sunroofs have been used for quite some time to provide partial opening of vehicle body roofs in order to increase ventilation and to also provide the roof with a somewhat convertible-like capability of opening the vehicle occupant compartment. With some sunroofs, the sunroof panel has a front edge that is secured to the roof and a rear edge that is movable upwardly from a closed position to an upper vented position under the control of a latch mechanism. This type of sunroof is usually referred to as a "pop-up" sunroof and has previously included a sunroof panel that is also detachable at its hinge and latch mechanism to permit complete removal of the panel in addition to being movable between the closed and vented positions. With other sunroofs, the sunroof panel is mounted for longitudinal movement between a forward position closing the roof opening and a rearwardly retracted position below the roof to the rear of the roof opening such that the roof opening is partially opened to the environment. Examples of these two types of sunroofs are disclosed by U.S. Pat. Nos.: 4,005,901; 4,038,910; 4,085,965; 4,103,962; 4,126,352; 4,350,385; 4,403,805; 4,523,785; and 4,541,665.

In some roof constructions, there is insufficient room for a sunroof panel of the rearwardly retractable type to have the panel stored below the roof in the rearwardly retracted position. To overcome this problem, it has previously been proposed to have the sunroof panel stored externally at a location above the roof in the rearwardly retracted position. Movement between the closed and rearwardly retracted positions may be actuated manually or by a suitable power actuator. Examples of such externally retractable sunroofs are disclosed by U.S. Pat. Nos. 3,993,348; 4,005,900; 4,043,590; 4,407,541; 4,426,112; 4,463,983; and 4,475,767.

DISCLOSURE OF INVENTION

An object of the present invention is to provide an improved vehicle sunroof of the externally retractable type which includes a track mechanism that detachably secures a sunroof panel to a peripheral frame to permit full exposure of the roof opening upon detachment and to permit a power actuator of the sunroof to move the attached panel between a closed position, an inclined vented position generally above the roof opening, and an externally retracted storage position rearward from the inclined vented position.

In carrying out the above object, the sunroof has the peripheral frame provided so as to be mountable within the opening in the vehicle roof on which the sunroof is installed. The frame has front and rear portions and also has side portions extending between the front and rear portions. A panel of the sunroof opens and closes the roof opening in which the frame is received and has front and rear edge portions respectively positionable adjacent the front and rear portions of the frame. Laterally spaced side edge portions of the panel extend between its front and rear edge portions and are positionable adjacent the side portions of the frame. The track mechanism of the sunroof has a pair of track assembly respectively mounted for movement on the side portions of the frame. Each track assembly includes at least one detachable connection for detachably securing one side edge portion of the sunroof panel and for releasing the panel to permit full exposure of the roof opening. The power actuator of the sunroof drives the track assemblies of the track mechanism between: (a) the closed position where the attached panel closes the roof opening, (b) the vented position where the front edge portion of the attached panel is located just rearwardly of the front frame portion with the panel inclined upwardly toward its rear edge portion which is raised above the roof; and (c) the externally retracted storage position where the inclined panel is positioned rearwardly from the vented position over the roof to the rear of the rear frame portion.

In the preferred construction, each track assembly of the track mechanism includes a support link having front and rear detachable connections that detachably secure the track assembly to the associated side edge portion of the panel. Each support link has front and rear ends with its front end having a connection to the power actuator to provide forward and rearward movement. An operating link of each track assembly extends between the frame and the associated support link to control the support link movement between the closed, vented, and storage positions.

The preferred construction of each track assembly includes a slide connection that connects its support link and operating link. This slide connection is located between the front and rear detachable connections of the support link. A slot of the slide connection is provided in the support link and a pin thereof is supported by the operating link and slidably received within the slot. The slot in the support link preferably has a rear end that projects upwardly to receive the pin and initiate the upward movement of the rear end of the attached panel as the power actuator commences rearward movement from the closed position to the vented position.

One of the detachable connections of each track assembly, preferably the front detachable connection, includes a pin on the panel and a hole in the support link for receiving the pin. The other detachable connection of each track assembly, preferably the rear detachable connection, includes a hole in the rear end of the support link and a hole in the side edge portion of the panel as well as a pin that is inserted through both of these holes to detachably secure the panel to the support link.

The objects, features, and advantages of the invention are readily apparent from the following detailed description of the best mode for carrying out the invention when taken in connection with the accompanying drawings.

BEST MODE FOR CARRYING OUT THE INVENTION

Figure 1:
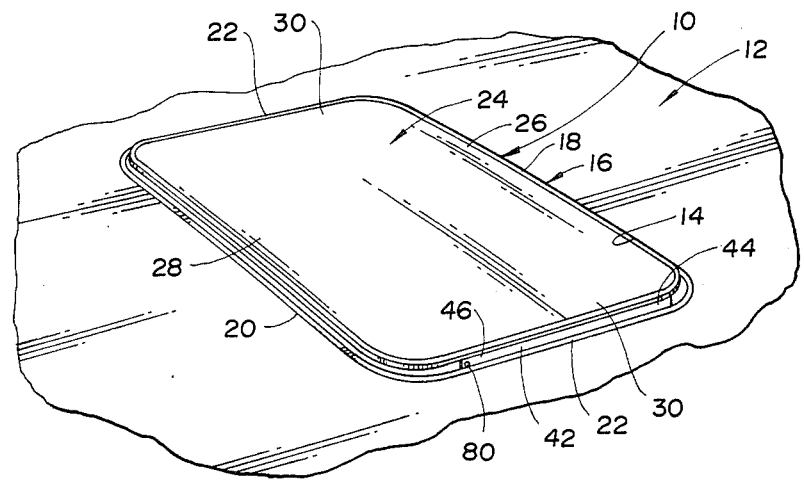
FIG. 1 is a partial perspective view of a vehicle roof including a sunroof constructed in accordance with the present invention and shown with its panel in a closed position.

With reference to FIG. 1 of the drawings, a sunroof generally indicated by 10 is illustrated installed on a vehicle roof 12 and is shown in a fully closed position as is hereinafter more fully described. This sunroof 10 is mounted in any conventional manner within a vehicle roof opening 14. Normally, the sunroof 10 will be installed as an after-market item with the roof opening 14 cut into the roof 12 to provide the installation. However, it is also possible for the sunroof 10 to be manufactured as an original equipment manufacturer item if such is deemed to be desirable.

Figure 2:
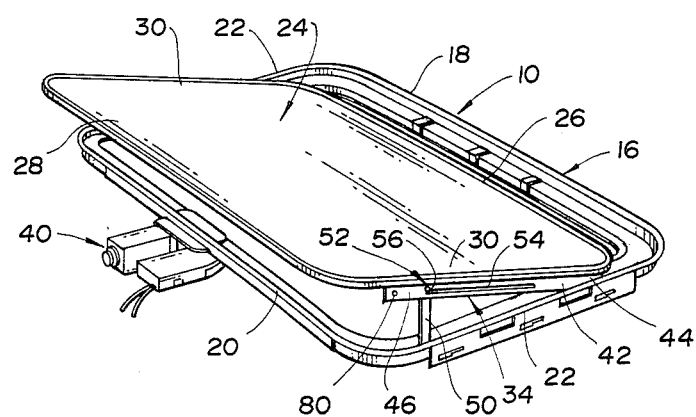
FIG. 2 is a perspective view of the sunroof removed from the roof and shown with its panel in an inclined vented position.

With further reference to FIG. 2, the sunroof 10 includes a peripheral frame 16 that is mountable within the opening in the vehicle roof during the installation. This frame 16 has front and rear portions 18 and 20 as well as laterally spaced side portions 22 extending between the front and rear portions. In the preferred construction illustrated, the sunroof 10 and the frame 16 have a generally rectangular shape that is elongated in a lateral direction and has rounded corners.

With continuing reference to FIGS. 1 and 2, a sunroof panel 24 of the sunroof 10 provides opening and closing of the roof opening 14 in which the frame 16 is received. This panel 24 has front and rear edge portions 26 and 28 respectively positionable adjacent the front and rear portions 18 and 20 of the frame 16 in the closed position shown in FIG. 1. Sunroof panel 24 also has laterally spaced side edge portions 30 extending between its front and rear edge portions 26 and 28 and positionable adjacent the side portions 22 of the frame 16 in the closed position of FIG. 1.

Figure 6:
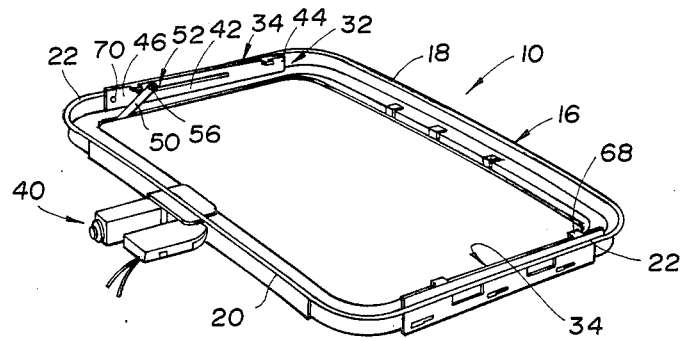
FIG. 6 is a perspective view that illustrates the frame of the sunroof with the panel detached and with the side track assemblies of the track mechanism shown as when the attached panel is positioned in the closed position.

As best illustrated in FIG. 6, a track mechanism 32 of the sunroof includes a pair of laterally spaced side track assemblies 34 respectively mounted for movement on the side portions 22 of the frame 16. As is hereinafter more fully described in connection with FIG. 7, each track assembly 34 includes at least one detachable connection 36,38 for detachably securing one side edge portion 30 of the sunroof panel 24 and for releasing the panel to permit full exposure of the roof opening.

Figure 3:
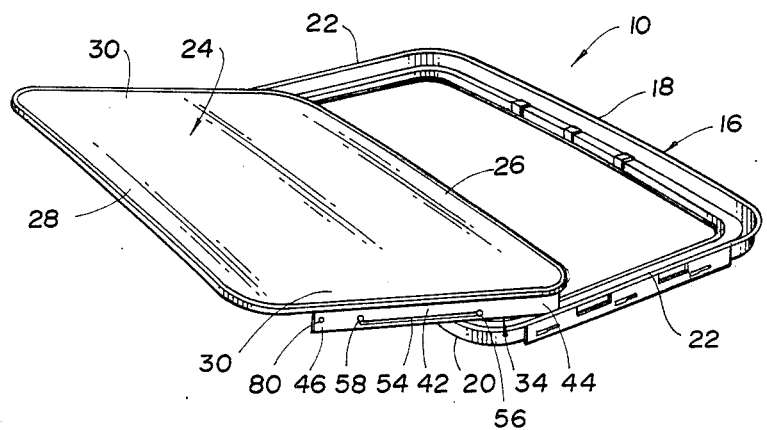
FIG. 3 is a perspective view of the sunroof removed from the vehicle roof as in FIG. 2 but shown with its panel in a rearwardly retracted storage position located to the rear of the vented position.

A power actuator 40 of the sunroof 10 is illustrated in FIGS. 2 and 6 and includes a conventional electric drive motor that is energized to selectively drive the track mechanism in opposite directions to position the panel 24 in the closed position of FIG. 1, the vented position of FIG. 2, or the externally retracted storage position of FIG. 3. In the closed position of FIG. 1, the attached panel 24 closes the roof opening 14 to thus enclose the vehicle occupant compartment from the environment. In the vented position of FIG. 2, the front edge portion 26 of the attached panel 20 is located just rearwardly of the front frame portion 18 with the panel inclined upwardly toward its rear edge portion 28 which is raised above the roof to provide ventilation. In the rearwardly retracted storage position of FIG. 3, the inclined panel 24 is positioned rearwardly from the vented position over the roof to the rear of the rear frame portion 20.

Figure 4:
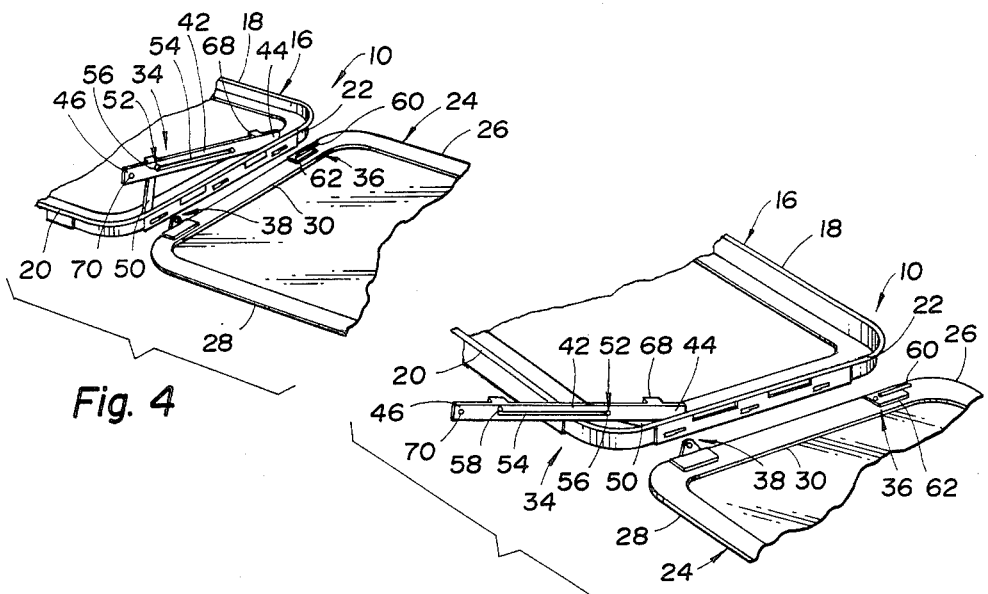
FIG. 4 is a partial view that illustrates the sunroof panel detached from the track mechanism which is shown with a side track assembly thereof in a position corresponding to the vented position.
Figure 5:
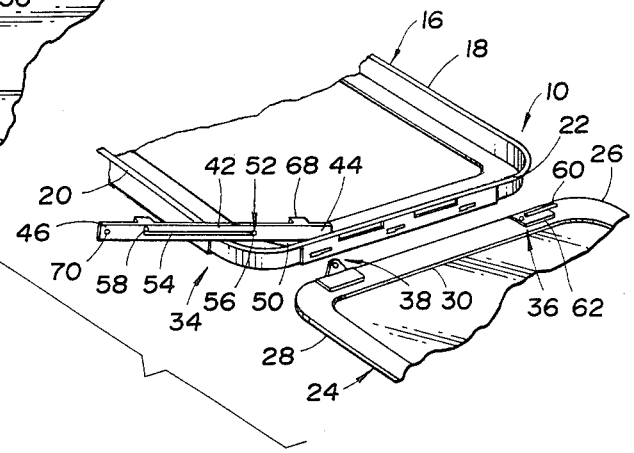
FIG. 5 is also a partial perspective view that illustrates the sunroof detached from the track mechanism as in FIG. 4 but showing the side track assembly in its position corresponding to the rearwardly retracted storage position.
Figure 7:
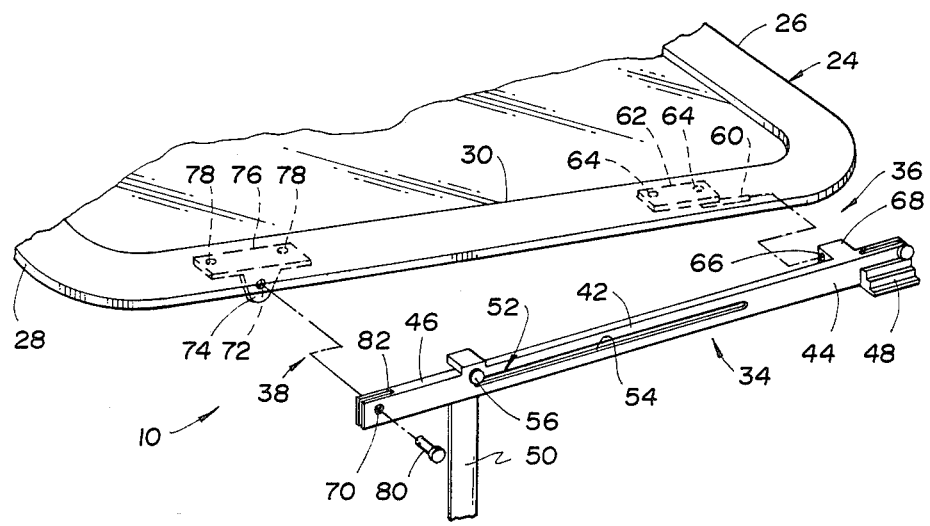
FIG. 7 is a partial perspective view that illustrates the construction of detachable connections that secure the lateral edges of the sunroof panel to the associated side track assembly of the track mechanism that moves and positions the attached panel.

With combined reference to FIGS. 2 and 7, each track assembly 34 includes a support link 42 of an elongated shape having front and rear detachable connections 36 and 38 that detachably secure the track assembly to the associated side edge portion 30 of the panel 24. The elongated support link has front and rear ends 44 and 46 with its front end having a conventional connection component 48 (FIG. 7) for connecting to an unshown cable mechanism that is connected to the power actuator 40 shown in FIGS. 2 and 6 to provide forward and rearward driving movement. Each track assembly also has an operating link 50 whose lower end is mounted by an unshown pivotal connection on the associated side frame portion 22 and whose other end is connected to the support link 42 to control the support link movement between the closed position as illustrated in FIG. 6, the vented position as illustrated in FIG. 4, and the externally retracted storage position as illustrated in FIG. 5.

A slide connection 52 of each track assembly 34 as best illustrated in FIG. 7 connects the associated support and operating links 42 and 50. This slide connection 52 is located between the front and rear detachable connections 36 and 38 of the support link 42 at its front and rear ends 44 and 46. The slide connection 52 includes an elongated slot 54 in the support link 42 and also includes a pin 56 that is supported by the operating link 54 and slidably received within the elongated slot in the support link. As shown in FIG. 5, the slot 54 in the support link 42 has a rear end 58 that projects upwardly to receive the pin 56 when the panel is in the closed position.

Upon the initial rearward movement of the panel 24 from the closed position of FIG. 1 under the impetus of the power actuator 40, the pin 56 is positioned within the rear slot end 58 (FIG. 5) such that each operating link 50 is pivoted upwardly from the generally horizontal position of FIG. 6 to a vertical position as the power actuator actuates rearward movement toward the vented position of FIG. 2. Continued rearward driving of the sunroof panel 24 by the power actuator 40 results in the elongated support link 42 sliding rearwardly as the pin 56 moves in a relative forward direction within slot 54 while the operating link 50 pivots to a rearwardly inclined position as shown in FIG. 5 which corresponds to the externally retracted storage position. Forward driving movement of the track mechanism 34 by the power actuator 40 reverses the movement of the track assemblies 34 to initially position the sunroof panel 24 in the vented position and then in the closed position.

As illustrated best in FIG. 7, the one detachable connection 36 which is located at the front end 44 of the support link 42 includes an elongated pin connector embodied by a pin 60 that is fixedly mounted by a bracket 62 and associated fasteners 64 on the panel 24 at the adjacent side edge portion 30. The front detachable connection 36 also includes a hole connector or hole 66 provided in a fixed location on a lug 68 on the front support link end 44. Pin 60 is received within the hole 66 to provide the detachable securement of the panel 24 to the track assembly 32 with the elongated pin extending parallel to the side edge portion 30 of the panel and with the hole 66 opening in a longitudinal direction with respect to the vehicle to receive the elongated pin.

As is also best shown in FIG. 7, the other detachable connection 38 at the rear of each track assembly 34 includes a laterally extending hole 70 in the rear end of the support link, a laterally extending hole 72 provided in a flange 74 of a bracket 76 secured by fasteners 78 to the adjacent side edge portion 30 of the panel 24, and a detachable pin 80 that is inserted laterally through both laterally extending holes 70 and 72 to detachably secure the panel to the support link. It should be noted that the preferred construction of the elongated support link 42 has an inverted U-shaped configuration and is provided at its rear end with an upper notch 82 such that the flange 74 can be inserted between the spaced rear end link portions to limit lateral movement between the track assembly 34 and the panel 24. Also, pin 80 can be provided with a ball detent that provides securement thereof within the holes 70 and 72. Likewise, other types of securement can be utilized in addition to the preferred connection construction disclosed.

While the best mode for carrying out the invention has been described in detail, those familiar with the art to which this invention relates will recognize various alternatives, designs, and embodiments for practicing the invention as defined by the following claims.

What is claimed is:

1. A sunroof for a vehicle roof, the sunroof comprising:
    a peripheral frame that is mountable within an opening in the vehicle roof, the frame having front and rear portions, and the frame also having side portions extending between the front and rear portions;
    a sunroof panel for opening and closing the roof opening in which the frame is received, the panel having front and rear edge portions respectively positionable adjacent the front and rear portions of the frame, and the panel having laterally spaced side edge portions extending between its front and rear edge portions and positionable adjacent the side portions of the frame;
    a track mechanism having a pair of track assemblies respectively mounted for movement on the side portions of the frame, each track assembly including front and rear detachable connections for detachably securing one side edge portion of the sunroof panel and for releasing the panel to permit full exposure of the roof opening, one of said detachable connections of each track assembly including an elongated pin connector and a hole connector, one of said connectors being fixedly located on the associated track assembly and the other connector being fixedly located at the associated side edge portion of the sunroof panel such that the hole connector receives the elongated pin connector to secure the sunroof panel with the elongated pin connector extending parallel to the adjacent side edge portion of the sunroof panel and with the hole connector opening in a longitudinal direction with respect to the vehicle to receive the elongated pin connector, the other detachable connection of each track assembly including a laterally extending hole in the track assembly and structure defining a laterally extending hole at the associated side edge portion of the sunroof panel as well as including a detachable pin that is inserted laterally through said laterally extending holes to cooperate with said one detachable connection in securing the sunroof panel; and
    the track assemblies of the track mechanism being driven by a power actuator for movement between: (a) a closed position where the attached panel closes the roof opening, (b) a vented position where the front edge portion of the attached panel is located just rearwardly of the front frame portion with the panel inclined upwardly toward its rear edge portion which is raised above the roof, and (c) an externally retracted storage position where the inclined panel is positioned rearwardly from the vented position over the roof to the rear of the rear frame portion.

2. A sunroof as in claim 1 wherein each track assembly includes a support link having front and rear ends at which the front and rear detachable connections are located, the front end of each support link having a power actuator connection component for providing forward and rearward movement, and each track assembly having an operating link that extends between the frame and the associated support link to control the support link movement between the closed, vented, and storage positions.

3. A sunroof as in claim 2 wherein each track assembly includes a slide connection that connects its support link and operating link.

4. A sunroof as in claim 3 wherein the slide connection of each track assembly is located between the front and rear detachable connections of the support link.

5. A sunroof as in claim 4 wherein the slide connection of each track assembly includes a slot in the support link and a pin that is supported by the operating link and slidably received within the slot in the support link, and the slot in the support link having a rear end that projects upwardly to receive the pin and initiate the upward movement of the rear end of the attached panel as the power actuator commences rearward movement from the closed position toward the vented position.

6. A sunroof as in claim 2 wherein said one detachable connection of each track assembly has the pin connector thereof embodied by an elongated pin fixedly mounted with respect to the sunroof panel and has the hole connector thereof embodied by a hole in the front end of the support link for receiving the pin.

7. A sunroof as in claim 2 wherein the other detachable connection of each track assembly has one laterally extending hole thereof in the rear end of the support link.

8. A sunroof as in claim 2 wherein the front detachable connection includes the pin connector embodied by an elongated pin at the side edge portion of the panel and has the associated hole connector embodied by a hole in the support link for receiving the elongated pin thereof, and the rear detachable connection including the pair of laterally extending holes which are respectively located at the side edge portion of the panel and in the rear end of the support link such that the detachable pin thereof is inserted laterally through the laterally extending holes thereof after the elongated pin of the front detachable connection is inserted into the hole thereof such that the front and rear detachable connections then cooperably secure the panel to the support link.

9. A sunroof for a vehicle roof, the sunroof comprising:
   a peripheral frame that is mountable within an opening in the vehicle roof, the frame having front and rear portions, and the frame also having side portions extending between the front and rear portions;
   a sunroof panel for opening and closing the roof opening in which the frame is received, the panel having front and rear edge portions respectively positionable adjacent the front and rear portions of the frame, and the panel having laterally spaced side edge portions extending between its front and rear edge portions and positionable adjacent the side portions of the frame;
   a track mechanism having a pair of track assemblies respectively mounted for movement on the side portions of the frame, each track assembly including a support link having front and rear detachable connections that detachably secure the track assembly to an associated side edge portion of the panel, such support link having front and rear ends adjacent which the front and rear detachable connections are located, the detachable connections of each support link permitting detachment of the panel so as to provide full exposure of the roof opening, and each track assembly having an operating link that extends between the frame and the associated support link to control support link movement, one of said detachable connections of each track assembly including an elongated pin connector and a hole connector, one of said connectors being fixedly located on the associated track assembly and the other connector being fixedly located at the associated side edge portion of the sunroof panel such that the hole connector receives the elongated pin connector to secure the sunroof panel with the elongated pin connector extending parallel to the adjacent side edge portion of the sunroof panel and with the hole connector opening in a longitudinal direction with respect to the vehicle to receive the elongated pin connector, the other detachable connection of each track assembly including a laterally extending hole in the track assembly and structure defining a laterally extending hole at the associated side edge portion of the sunroof panel as well as including a detachable pin that is inserted laterally through said laterally extending holes to cooperate with said one detachable connection in securing the sunroof panel; and
   the track assemblies of the track mechanism being driven by a power actuator for movement between: (a) a closed position where the attached panel closes the roof opening, (b) a vented position where the front edge portion of the attached panel is located just rearwardly of the front frame portion with the panel inclined upwardly toward its rear edge portion which is raised above the roof, and (c) an externally retracted storage position where the inclined panel is positioned rearwardly from the vented position over the roof to the rear of the rear frame portion.

10. A sunroof for a vehicle roof, the sunroof comprising:
    a peripheral frame that is mountable within an opening in the vehicle roof, the frame having front and rear portions, and the frame also having side portions extending between the front and rear portions;
    a sunroof panel for opening and closing the roof opening in which the frame is received, the panel having front and rear edge portions respectively positionable adjacent the front and rear portions of the frame, and the panel having laterally spaced side edge portions extending between its front and rear edge portions and positionable adjacent the side portions of the frame;
    a track mechanism having a pair of track assemblies respectively mounted for movement on the side portions of the frame, each track assembly including a support link having front and rear detachable connections that detachably secure the track assembly to an associated side edge portion of the panel, the detachable connections of each support link permitting detachment of the panel so as to provide full exposure of the roof opening, each support link having front and rear ends adjacent which the front and rear detachable connections are located, each track assembly having an operating link that extends between the frame and the support link to control support link movement, a slide connection that connects the support link and operating link of each track assembly at a location between the front and rear detachable connections of the support link, the slide connection of each track assembly including a slot in the support link and a pin that is supported by the operating link and slidably received within the slot in the support link and the slot in the support link having a rear end that projects upwardly to receive the pin and initiate the upward movement of the rear end of the attached panel as the panel is initially moved rearwardly from a closed position, one of said detachable connections of each track assembly including an elongated pin connector and a hole connector, one of said connectors being fixedly located on the associated track assembly and the other connector being fixedly located at the associated side edge portion of the sunroof panel such that the hole connector receives the elongated pin connector to secure the sunroof panel with the elongated pin connector extending parallel to the adjacent side edge portion of the sunroof panel and with the hole connector opening in a longitudinal direction with respect to the vehicle to receive the elongated pin connector, the other detachable connection of each track assembly including a laterally extending hole in the track assembly and structure defining a laterally extending hole at the associated side edge portion of the sunroof panel as well as including a detachable pin that is inserted laterally through said laterally extending holes to cooperate with said one detachable connection in securing the sunroof panel; and
    the track assemblies of the track mechanism being driven by a power actuator for movement between: (a) the closed position where the attached panel closes the roof opening, (b) a vented position where the front edge portion of the attached panel is located just rearwardly of the front frame portion with the panel inclined upwardly toward its rear edge portion which is raised above the roof, and (c) an externally retracted storage position where the inclined panel is positioned rearwardly from the vented position over the roof to the rear of the rear frame portion.

* * * * *

UNITED STATES PATENT AND TRADEMARK OFFICE
CERTIFICATE OF CORRECTION

PATENT NO. : 4,747,637

DATED : May 31, 1988

INVENTOR(S) : John R. Lenoir et al.

It is certified that error appears in the above-identified patent and that said Letters Patent is hereby corrected as shown below:

Column 7, line 24, claim 9, after "panel" change "such" to read -- each --.

Signed and Sealed this

Thirty-first Day of January, 1989

Attest:

DONALD J. QUIGG

*Attesting Officer*  *Commissioner of Patents and Trademarks*